3,040,067
14-DEHYDRO PROGESTERONE AND INTERMEDIATES IN THE PRODUCTION THEREOF
Leopold Ruzicka and Hans Heusser, Zurich, Switzerland, assignors to Ciba Corporation, a corporation of Delaware
No Drawing. Filed Feb. 18, 1955, Ser. No. 489,286
Claims priority, application Switzerland Feb. 24, 1954
10 Claims. (Cl. 260—397.4)

This invention relates to a novel process for reducing steroid-14:16-dienes.

It is known that steroid-14:16-dienes when subjected to catalytic reduction yield 14-iso-17-iso-steroids, that is to say steroids having a configuration in the 14- and 17-position which does not correspond to the normal configuration for the corresponding natural substances.

An object of the present invention is to provide a process for the reduction of steroid-14:16-dienes to form 14-dehydro-steroids having the normal configuration in the 17-position. These compounds can be hydrogenated in known manner to steroids with a normal configuration in the 14-position. The novel process comprises reducing steroid-14:16-dienes by treatment with nascent hydrogen.

In carrying out the process, the nascent hydrogen is advantageously formed by the reaction of an alkali metal or an alkaline earth metal, especially lithium, but also sodium, potassium, calcium or an alkali metal amalgam, with an alcohol alone and/or a nitrogen base. Among the alcohols there may be mentioned aliphatic alcohols, such as methanol, ethanol, propanol, isopropanol, butanol, amyl alcohol or the like. As nitrogen bases there are especially suitable ammonia, and also aliphatic amines, such as methylamine, ethylamine, propylamine, ethylene diamine, either alone or in combination with one another.

When the reduction is carried out with the above mentioned metals and an alcohol alone, it is of advantage to work at a raised temperature, for example, between 30° and 100° C. When the reduction is carried out with a volatile nitrogen base, low temperatures must be maintained, in the case of ammonia about −40° C., or it may be carried out under superatmospheric pressure and at a higher temperature, for example, at room temperature.

In accordance with the invention the reduction is advantageously carried out in the presence of an organic solvent, such as ether, for example, diethyl ether, dimethoxy-ethane, dioxane, a hydrocarbon, for example, petroleum ether, toluene or the like.

As starting materials there are suitable steroid-14:16-dienes obtained from natural steroids or those obtained by total synthesis, that is to say optically active or racemic steroid-14:16-dienes, and also the corresponding compounds of the 19-nor-and/or D-homo-series. Especially important are the starting materials having a free or functionally converted acetyl, oxyacetyl or carboxyl group in the 7-position, and which contain in the 3-, 11- and/or 18-position a free or functionally converted hydroxyl or oxo group, for example, an esterified or etherified hydroxyl group or an acetalized oxo group and/or further double bonds, such as a double bond starting from the 5-carbon atom, that is to say in the 4:5- or 5:6-position. The hydroxyl groups in the functionally converted oxyacetyl radical are present in esterified or etherified form. As a functionally converted carboxyl group there may be mentioned more especially an esterified carboxyl group, but also for example, acid amide or nitrile groups. Such starting materials are known or can be made by the methods described in specifications Nos. 480,061, filed January 5, 1955, by T. Reichstein et al., 480,062, filed January 5, 1955, by T. Reichstein et al., 485,324, filed January 31, 1955, by Wettstein et al., 485,326, filed January 31, 1955, by Wettstein et al., now Patent No. 2,883,378.

Groups which are capable of being reduced under the conditions of the present process, for example, oxo groups, may be protected intermediately, especially by conversion into acetalized oxo groups, or may be simultaneously reduced, for example, oxo to hydroxyl groups. Hydroxyl groups can be reconverted to oxo groups by the known dehydrogenation methods.

The products of this invention are of therapeutic value and can be used as medicaments, as far as they have the configuration and substituents of therapeutically valuable steroids, for example the 14-dehydroprogesterone which has a progestational effect and can be used as a medicament for the treatment of corpus luteum deficiency. The products of the invention are also useful as intermediate products. As mentioned above, they can be converted into the corresponding steroids with normal configuration in 14-position, for example the 14-dehydroprogesterone into progesterone by the following scheme of reactions:

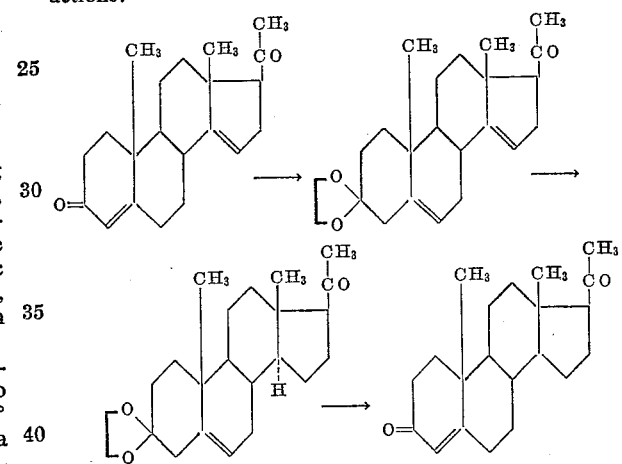

The following examples illustrate the invention the parts being by weight unless otherwise stated, and the relationship of parts by weight to parts by volume being the same as that of the gram to the cubic centimeter:

*Example 1*

1 part of pure $\Delta^{5:14:16}$-3$\beta$-hydroxy-20-oxo-pregnatriene melting at 186–187° C. is dissolved in a mixture of 40 parts by volume of dioxane and 40 parts by volume of ether, and the solution is introduced dropwise with the exclusion of moisture at −40° C. to −50° C. with vigorous mixing into a solution of 1.25 parts of lithium in 600 parts by volume of liquid ammonia. After one hour there are added to the reaction mixture drop by drop 55 parts by volume of n-propanol. After the addition of 1 part of lithium the reaction mixture is stirred for a further ½ hour and then poured on to ice.

The mixture is worked up by extraction with ether to yield 1 part of a crude reduction product which is oxidized in known manner in benzene solution with aluminum tertiary butylate and cyclohexanone as follows: One part of the crude reduction product is dissolved in 25 parts by volume of benzene and 25 parts by volume of cyclohexanone and after the addition of one part of aluminum tertiary butylate refluxed for 10 hours. The reaction mixture is cooled, treated with water, filtered and the solvents are distilled off in vacuo. As it is known that 20-oxo-pregnane derivatives when oxidized by the Oppenauer method often yield non-unitary reaction products, it is recommended to subject the crude product to an after-oxidation with chromium trioxide (0.85 part) in pyridine (25 parts by volume) at 20° C. Working up in the normal manner by pouring the reaction mixture into water and extracting with a mixture of benzene and ether (1:1) yields a crude product from which 14-dehydro-progesterone is obtained by chromatographic purification (0.3 part), which crystallizes from hexane in coarse prisms melting at 127–128° C.

By further recrystallization the melting point is raised to 134° C. The constitution of this compound can be shown by the following conversions:

By reducing the 14-dehydroprogesterone in the manner described above with lithium, ammonia and n-propanol and after-oxidizing, for example by means of pyridine chromic acid complex as described above, the $\Delta^{14}$-3;20-dioxo-allopregnene melting at 186–187° C.; $[\alpha]_D = +78°$ (in chloroform) is obtained, which can also be obtained from the known $\Delta^{14}$-3β-acetoxy-20-oxopregnene by hydrolysis and oxidation with pyridine chromic acid complex or according to Oppenauer's method.

*Example 2*

1 part of pure $\Delta^{5,14,16}$-3β-hydroxy-20-oxo-pregnatriene melting at 186–187° C., λ maximum=310 mμ (log ε= 4.14), is dissolved in a mixture of 20 parts by volume of dioxane and 20 parts by volume of ether and added dropwise with the exclusion of moisture and vigorous mixing at −45° C. to a solution of 0.13 part of lithium in 300 parts by volume of liquid ammonia. After one hour n-propanol is added dropwise to the reaction mixture until the solution loses color. After adding 0.03 part of lithium the reaction mixture is stirred for a further 30 minutes, then n-propanol is once more added until the solution loses color, whereupon the two last operations (addition of lithium and discoloration with n-propanol) are repeated once again.

Working up is carried out by evaporation of the ammonia, whereupon the reaction mixture is neutralized with 2 N-sulfuric acid. The mixture is worked up by extraction with ether to yield 1 part of a crude product from which there are isolated by chromatographic purification over aluminum oxide and fractionated crystallization from methanol the $\Delta^{5,14}$-3β;20α-dihydroxy-pregnadiene melting at 218–220° C. and the $\Delta^{5,14}$-3β;20β-dihydroxy-pregnadiene melting at 214–215° C. The 3;20-diacetate of the first compound is prepared with acetic anhydride and pyridine and melts at 178–179° C. $[\alpha]_D = -32°$ (CHCl$_3$); the isomeric diacetate also melts at 178–179°; $[\alpha]_D = -10°$ (CHCl$_3$). The two compounds show in a mixed melting point test a lowering of the melting point of about 20° C.

The oxidation of the epimeric $\Delta^{5,14}$-3β;20-dihydroxy-pregnadienes at carbon atom 20 according to Oppenauer's method in benzene with aluminum tertiary butylate and cyclohexanone followed by an after-oxidation with chromium trioxide in pyridine according to the details given in Example 1 leads to 14-dehydroprogesterone melting at 134° C. The compound exhibits in the ultraviolet spectrum an absorption maximum at 242 mμ (log=4.2).

*Example 3*

0.37 part of $\Delta^{5,14,16}$-3β-hydroxy-20-oxo-pregnatriene is dissolved in 10 parts by volume of n-propanol. To the boiling solution there is added in the course of 30 minutes 0.4 part of clean sodium shavings. After a further 40 minutes all of the sodium has reacted. The cooled reaction mixture is poured into water, extracted with ether and the ether evaporated after washing and drying. By chromatographic separation over aluminum oxide and fractionated crystallization from methanol there are isolated the $\Delta^{5,14}$-3β;20α-dihydroxy-pregnadiene melting at 218–220° C., and the $\Delta^{5,14}$-3β:20β-dihydroxy-pregnadine melting at 214–215° C.

What is claimed is:

1. A process which comprises hydrogenating a 20-keto-14:16-pregnadiene by contacting it with a member of the group consisting of an alkali metal and an alkaline earth metal in the presence of a member of the group consisting of a lower alkanol, ammonia, primary lower alkylamines, and mixtures thereof, and isolating the corresponding 14-dehydro-pregnenes oxygenated at position 20 and having the normal configuration in the 17-position.
2. A process as claimed in claim 1, in which the hydrogenation with lithium is carried out in the presence of a mixture of ammonia and propanol.
3. A process as claimed in claim 1, in which an oxo group in the 20-keto-14:16-pregnadiene is simultaneously reduced to a hydroxyl group.
4. A process as claimed in claim 3, which comprises dehydrogenating the hydroxyl groups in compounds obtained to oxo groups.
5. A non-catalytic process which comprises hydrogenating $\Delta^{5,14,16}$-3β-hydroxy-20-oxopregnatriene by contact with nascent hydrogen and recovering the corresponding 14-dehydro-pregnadiene having the normal configuration in the 17-position.
6. A process in accordance with claim 5, wherein hydroxyl groups in the hydrogenation product are dehydrogenated so as to produce 14-dehydroprogesterone.
7. $\Delta^{5,14}$-3β,20α-dihydroxy-pregnadiene.
8. $\Delta^{5,14}$-3β,20β-dihydroxy-pregnadiene.
9. 14-dehydroprogesterone.
10. A non-catalytic process which comprises treating 20-keto-14:16-pregnadienes with nascent hydrogen and recovering the corresponding 14-dehydro-pregnenes having the normal configuration in the 17-position.

References Cited in the file of this patent

Kendal: Smith's Inorganic Chemistry, 2nd edition, pages 534–5 (1937).
Plattner: Helv. Chim. Acta, 31, 249–56 (1948).